Patented Mar. 1, 1932

1,847,540

UNITED STATES PATENT OFFICE

GEORGE ETHELBERT SANDERS, OF BROOKLYN, NEW YORK

METHOD OF MAKING INSECTICIDES FLOATABLE

No Drawing.   Application filed March 11, 1930.   Serial No. 435,034.

The object of this invention is a method of utilizing the heat generated by slaking lime to coat insecticide particles with fatty acids and render them waterproof and floatable on water.

It has been found advantageous to coat insecticides with metallic salts of fatty acids or metallic soaps in order to waterproof them or render less toxic to plants or more slowly toxic to insects. This has advantages in the control of Japanese beetles and many other insects.

The method which I employ does not involve working in a water solution nor does it involve the combining of the fatty acid with a base, such as sodium or potassium, neither does it involve the use of artificial heat or heat other than that produced by the slaking of quicklime. The material which I shall describe is especially designed for the control of mosquitoes but may be used for other purposes such as dusting trees, vegetables, etc. for the control of certain insects.

The method which I employ is as follows:

I place quicklime in a hydrator or suitable container, preferably one equipped with an agitator. To this I add water enough to bring it to a dry powder or form from a portion or all of it, hydrated lime. This water may carry in suspension or in solution a poison or the poison may be added separately either before or after the water. While the mass is hot and being agitated I add a fatty acid enough to coat most of the particles in the mass and render them floatable. The fatty acid may be mixed with either the lime or the poison either before or after adding the water to the lime without departing from the spirit of the invention. I then grind and air float in a suitable mill.

An example of the proportions used is:

300 lbs. quicklime
300 lbs. paste copper arsenite

When at its maximum heat and under agitation add 12 lbs. of stearic acid. This mixture should be ground before using to get the best results but may be used directly.

Any form of quicklime may be used, either lump, pebble or ground. Numerous arsenical salts may be substituted for the copper arsenite such as zinc arsenite, sodium arsenate, sodium arsenite, etc. Other insecticides other than arsenic may be used as finely ground pyrethrum, hellebore, derris, nicotine dust, etc. In case a dry form of arsenic is being used, the water to slake the lime and develop the heat necessary to the melting of the stearic acid, may be added separately. Either single, double or triple pressed stearic acid may be used or many other fatty acids or salts of fatty acids may be substituted or mixtures of two or more fatty acids may be used.

By fatty acids I mean stearic, palmatic, and oleic acid or mixtures of all three; lard, oil, tallow, cocoa butter, etc. Many changes and modifications may be made in this formula without departing from the spirit of the invention which consists in utilizing the heat of slaking lime to melt fatty acids or salts of fatty acids and with suitable agitation to coat the particles of dust formed and cause them to become waterproof and floatable on water.

I claim:

1. A method of coating particles of insecticide dust and causing them to become floatable on water by utilizing the heat of slaking lime for melting stearic acid to coat the particles.

2. A method of coating particles of insecticide dust and causing them to become floatable on water by utilizing the heat of slaking lime for melting salts of stearic acid to coat the particles.

3. The method of making a water floatable insecticide by adding water to a mixture of dry calcium oxide, an insecticide and stearic acid, the amount of water being just sufficient to convert the lime to dry hydrate of lime and by so doing, generate enough heat to melt the stearic acid so as to coat the hydrated lime and the insecticide with the stearic acid, and finally grinding the product so formed.

Signed at Brooklyn, New York, in the county of Queens and State of New York this 10th day of March, A. D. 1930.

GEORGE ETHELBERT SANDERS.